(No Model.)
E. A. MAGEE.
BLOWER.
No. 344,000. Patented June 22, 1886.
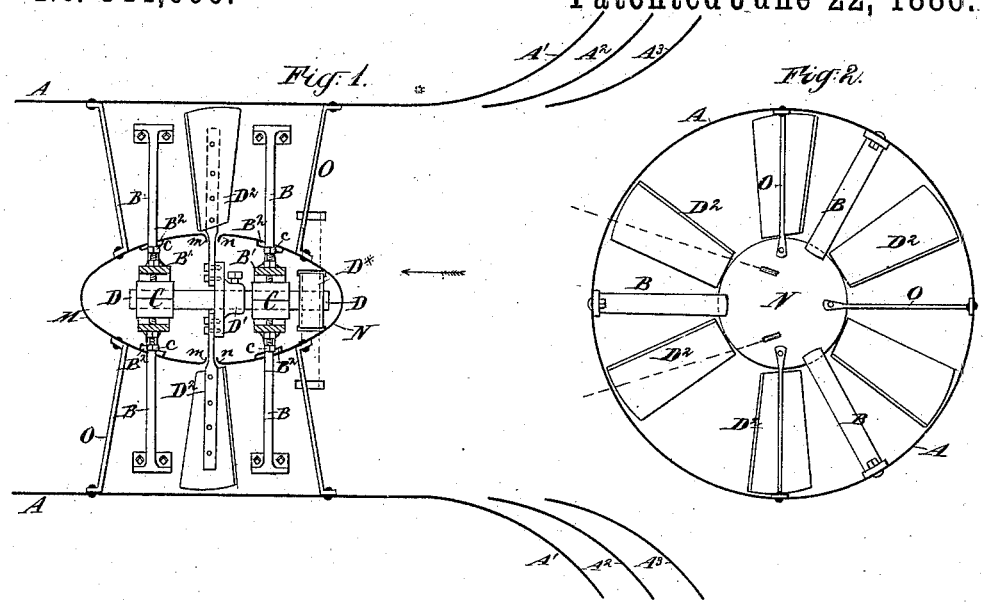
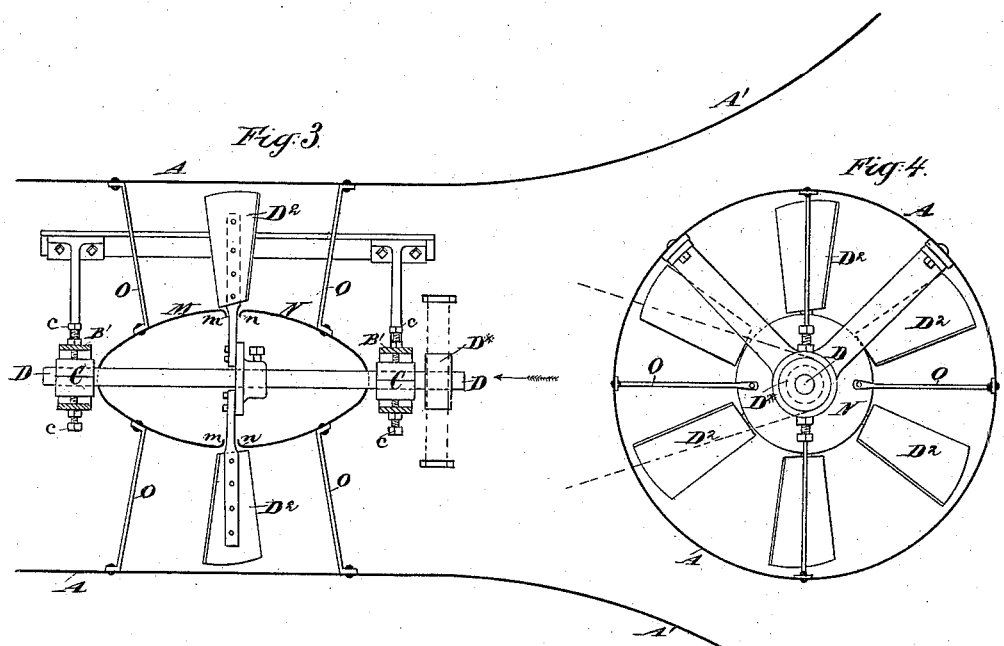
Witnesses:
Charles R. Searle
E. Brookes
Inventor:
Edward A. Magee
by his attorneys
Thomas Drew Stetson
N. PETERS, Photo-Lithographer, Washington, D. C.

UNITED STATES PATENT OFFICE.

EDWARD A. MAGEE, OF BROOKLYN, NEW YORK.

BLOWER.

SPECIFICATION forming part of Letters Patent No. 344,000, dated June 22, 1886.

Application filed May 15, 1885. Serial No. 165,582. (No model.)

*To all whom it may concern:*

Be it known that I, EDWARD A. MAGEE, engineer in the United States Navy, residing in Brooklyn, Kings county, in the State of New York, have invented certain new and useful Improvements relating to Blowers, of which the following is a specification.

My improvement may apply to all the class of blowers which act obliquely or screw-wise. In this class the shaft extends longitudinally of the circular case, and is rotated at the proper rate by a belt or other suitable device. In this class of blowers only a certain portion of the blades near the periphery can be properly utilized. I fill the central place with a tight casing occupying, preferably, from a third to a half of the entire blower, making it a hollow shell of double conoidal form, so as to contract the passage by degrees, and again allow it to enlarge by degrees after passing the contracted annular space. This form of the central shell or hub offers the minimum resistance to the action of the air.

The accompanying drawings form a part of this specification, and represent what I consider the best means of carrying out the invention.

Figure 1 is a longitudinal section partly in elevation. Fig. 2 is an end view. These figures show a short shaft having the bearings and pulley within the central shell. Fig. 3 is a longitudinal section, and Fig. 4 an end view showing a modification in which the shaft is longer, and the bearings and pulley are exterior to the central shell.

Similar letters of reference indicate corresponding parts in all the figures where they occur.

Referring to Figs. 1 and 2, A is a fixed cylindrical casing inclosing a screw. A' is an extension from A, formed, by preference, from the same piece of metal or other suitable material. The portion of A' farthest from A is flared outward, making the casing A' trumpet-mouthed. $A^2$ and $A^3$ are additional trumpet-mouthed casings, of sheet metal or analogous material, extending beyond the trumpet-mouthed end of A', and arranged relatively thereto in the manner shown. B B, &c., are stout braces extending inward from A, and supporting a ring, B', within which is mounted in boxes C the driving-shaft D, carrying a hub, D', on which are bolted screw-arms $D^2$. A continuous rotary motion is imparted by a belt (shown in dotted lines) impelled by a steam-engine or other suitable power, and running on a pulley, D*. M and N are the two parts of my central casing. They are hollow and of conoidal form, as shown, with their bases applied nearly together, but leaving a sufficient space between in which the screw-arms $D^2$ may traverse around without touching. The edges at the base of each are curved inward, as indicated by *m n*. O O are braces, which connect these parts M N rigidly to the main casing A. The proper apertures are formed in both the exterior casing, A, and inner casing, M N, through which the belt traverses in communicating the motion. The bearings C are formed in halves and pressed firmly together by screws *c*. By adjusting these screws either bearing can be changed in position to a certain extent, with the effect to correspondingly change the plane of rotation of the screw-blades. This is especially important with my invention in avoiding any friction of the screw-arms $D^2$ against the bases of the respective casings M N, the braces B, as formed with inclined lugs $B^2$, which are tapped to receive screws inserted through the casings M N, thus serving to additionally support the latter. The hollow conical casings M N are made each in a single piece with slots extending longitudinally from the large end to a sufficient distance to accommodate the braces B. This casing performs an important function in filling the central portion of the space. Ordinary screw-blowers with open spaces near the center are liable, when the blowing is forced, not only to have the center inefficient, but to allow some of the air to blow in the opposite direction through the center. It is subject to the increased pressure which obtains in the passage beyond the blower, and is not acted on with so much efficiency by the screw-wings as to resist such pressure. My casings M N make the blower more efficient.

Referring to Figs. 3 and 4, the same letters indicate corresponding parts. The bearings C are in this form of the device outside of the casing M and N, as is also the pulley D*.

I attach importance to the curving inward of the edges *m n* as materially contributing to the passage of the air past the bases of the two nearly-abutting cones.

I attach importance to the adjusting means *c*, in combination therewith, and aiding to keep the narrow portion of the screw-arms $B^2$ in their proper path in the narrow aperture provided.

I attach importance to the braces B, with the provisions for enabling them to support both the shaft and the cones. The braces O also are important in preventing the cones from becoming skewed.

The forms and proportions of the parts may be varied within wide limits.

The additional guiding-cones $A^2$ $A^3$ shown in Fig. 1 may be used with the form of the other parts shown in Fig. 3; or the plain trumpet-mouth form of the casing A A' shown in Fig. 3 may be used with the other parts shown in Fig. 1.

What I have termed the "screw-arms" or "screw-blades" $D^2$ need not be true screws. Plane-blades properly inclined may serve.

Parts of the invention may be used without the whole. The adjusting means *c* may be omitted, if sufficient care is taken to locate the several members of the apparatus in manufacturing and setting them up. One of the casings, as M, may be dispensed with, and the other, as N, relied on alone to perform the duties. I prefer the whole used together, as shown.

I claim as my invention—

1. The hollow cones M N, arranged reversely with their edges *m n* inward and supported by braces O, which connect them to the case A, the shaft D, carrying screw-blades $D^2$, external to the cones, but with their arms passing between the edges *m n*, the boxes C, and means, as *c*, for adjusting the position of the shaft, all combined and arranged to serve as set forth.

2. In a blower, as described, the combination, with the shell, screw-shaft, and cones, of the braces B, carrying rings B', and inclined lugs $B^2$, which latter support the cones by engaging their inner surfaces, and the former support the screw-shaft D, as specified.

3. The combination, with the shaft D, having screw-blades $D^2$, and with the case A, of the braces B, supported from said case, and having rings B', which support the said shaft, the reversely-arranged hollow cones M N, supported by the braces O, and the inclined lugs $B^2$, fixed upon the braces B, and arranged to engage the inner surfaces of said cones, the bearings C, and adjusting-screws *c*, arranged to adjust the said bearings with relation to the rings B', as herein set forth.

In testimony whereof I have hereunto set my hand at New York city, New York, this 12th day of May, 1885, in the presence of two subscribing witnesses.

EDWARD A. MAGEE.

Witnesses:
THOMAS DREW STETSON,
CHARLES R. SEARLE.